(12) United States Patent
Dyszkiewicz et al.

(10) Patent No.: US 11,131,456 B2
(45) Date of Patent: Sep. 28, 2021

(54) GAS TURBINE ENGINE WITH RESONATOR RINGS

(71) Applicant: Siemens Aktiengesellschaft, Munich (DE)

(72) Inventors: Wojciech Dyszkiewicz, Charlotte, NC (US); Daniel Cassar, Charlotte, NC (US); John M. Crane, Winter Springs, FL (US); Sachin Terdalkar, Oviedo, FL (US); Rajesh Rajaram, Winter Park, FL (US)

(73) Assignee: Siemens Energy Global GmbH & Co. KG, Munich (DE)

( * ) Notice: Subject to any disclaimer, the term of this patent is extended or adjusted under 35 U.S.C. 154(b) by 227 days.

(21) Appl. No.: 16/303,434

(22) PCT Filed: Jul. 25, 2016

(86) PCT No.: PCT/US2016/043856
§ 371 (c)(1),
(2) Date: Nov. 20, 2018

(87) PCT Pub. No.: WO2018/021996
PCT Pub. Date: Feb. 1, 2018

(65) Prior Publication Data
US 2020/0333001 A1 Oct. 22, 2020

(51) Int. Cl.
*F23M 20/00* (2014.01)
*F02C 7/24* (2006.01)
*F23R 3/00* (2006.01)

(52) U.S. Cl.
CPC ............ *F23M 20/005* (2015.01); *F02C 7/24* (2013.01); *F23R 3/002* (2013.01); *F05D 2240/35* (2013.01); *F05D 2260/963* (2013.01); *F23R 2900/00014* (2013.01)

(58) Field of Classification Search
CPC .................. F23M 20/005; F23R 3/002; F23R 2900/00014; F05D 2260/963; F05D 2240/35; F02C 7/24; F02C 7/045
See application file for complete search history.

(56) References Cited

U.S. PATENT DOCUMENTS

| 4,452,335 A * | 6/1984 | Mathews | .................. F02C 7/24 |
| | | | 181/214 |
| 6,290,022 B1 * | 9/2001 | Wolf | .................... G10K 11/172 |
| | | | 181/286 |
| 6,341,485 B1 | 1/2002 | Liebe | |

(Continued)

FOREIGN PATENT DOCUMENTS

| CN | 103975199 A | 8/2014 |
| EP | 1221574 A2 | 10/2002 |

(Continued)

OTHER PUBLICATIONS

PCT International Search Report and Written Opinion dated Apr. 10, 2017 corresponding to PCT Application No. PCT/US2016/043856 filed Jul. 25, 2016.

*Primary Examiner* — Alain Chau

(57) ABSTRACT

A gas turbine engine has a resonator ring that is formed by two circumferentially extending rings. The first and second circumferentially extending rings have located within them baffles. Both the first ring and the second ring are able to mitigate acoustic frequencies generated by the gas turbine engine.

20 Claims, 4 Drawing Sheets

(56) References Cited

U.S. PATENT DOCUMENTS

| | | | |
|---|---|---|---|
| 6,530,221 B1* | 3/2003 | Sattinger | F01D 25/30 181/213 |
| 6,609,592 B2* | 8/2003 | Wilson | B23K 26/0006 181/292 |
| 6,827,180 B2* | 12/2004 | Wilson | F02C 7/045 181/292 |
| 6,837,051 B2* | 1/2005 | Mandai | F23R 3/005 60/725 |
| 6,973,790 B2 | 12/2005 | Suenaa et al. | |
| 7,089,741 B2* | 8/2006 | Ikeda | F23R 3/002 60/725 |
| 7,104,065 B2 | 9/2006 | Benz et al. | |
| 7,194,862 B2* | 3/2007 | Sattinger | F01D 25/30 181/212 |
| 7,311,175 B2* | 12/2007 | Proscia | F01D 25/30 181/214 |
| 7,549,506 B2* | 6/2009 | Sattinger | F01D 25/30 181/210 |
| 7,784,283 B2 | 8/2010 | Yu et al. | |
| 7,788,926 B2 | 9/2010 | Johnson et al. | |
| 7,832,211 B2* | 11/2010 | Ikeda | F23M 20/005 60/725 |
| 7,874,159 B2* | 1/2011 | Gerendas | F23R 3/002 60/754 |
| 7,926,278 B2* | 4/2011 | Gerendas | F23R 3/002 60/725 |
| 7,946,385 B2* | 5/2011 | Lalane | G10K 11/172 181/296 |
| 7,963,362 B2* | 6/2011 | Lidoine | F02C 7/24 181/214 |
| 8,061,141 B2 | 11/2011 | Johnson et al. | |
| 8,413,443 B2* | 4/2013 | Johnson | F23R 3/00 60/725 |
| 8,733,496 B2* | 5/2014 | Ono | F23R 3/005 181/213 |
| 9,188,342 B2* | 11/2015 | Melton | F23R 3/286 |
| 9,395,082 B2 | 7/2016 | Tiwary et al. | |
| 10,066,548 B2* | 9/2018 | Gilson | F02K 1/827 |
| 2003/0233831 A1 | 12/2003 | Suenaga et al. | |
| 2004/0248053 A1 | 12/2004 | Benz et al. | |
| 2005/0166596 A1* | 8/2005 | Sattinger | F02C 7/24 60/772 |
| 2005/0223707 A1* | 10/2005 | Ikeda | F23M 20/005 60/725 |
| 2007/0034447 A1* | 2/2007 | Proscia | F02C 7/24 181/290 |
| 2007/0209366 A1* | 9/2007 | Gerendas | F23M 20/005 60/752 |
| 2007/0256889 A1 | 11/2007 | Yu et al. | |
| 2007/0283700 A1* | 12/2007 | Gerendas | F23R 3/002 60/754 |
| 2008/0041058 A1 | 2/2008 | Johnson et al. | |
| 2008/0245337 A1* | 10/2008 | Bandaru | F23R 3/283 123/308 |
| 2009/0094985 A1* | 4/2009 | Johnson | F23R 3/06 60/752 |
| 2010/0236245 A1 | 9/2010 | Johnson et al. | |
| 2011/0138812 A1 | 6/2011 | Johnson | |
| 2012/0240583 A1* | 9/2012 | Penz | F23R 3/10 60/722 |
| 2013/0074501 A1* | 3/2013 | Tiwary | F02C 7/24 60/725 |
| 2013/0206500 A1* | 8/2013 | Ono | F23R 3/002 181/213 |
| 2013/0255260 A1 | 10/2013 | Carey et al. | |
| 2015/0082794 A1* | 3/2015 | Schilp | F02K 1/827 60/722 |
| 2015/0159879 A1 | 6/2015 | Zhu et al. | |
| 2015/0369127 A1* | 12/2015 | Gilson | F02C 7/24 415/119 |
| 2016/0061448 A1* | 3/2016 | Davenport | F23R 3/007 60/754 |

FOREIGN PATENT DOCUMENTS

| | | |
|---|---|---|
| EP | 2385303 A1 | 9/2011 |
| JP | S604883 A | 1/1985 |
| JP | H02126099 A | 5/1990 |
| JP | 2001254634 A | 9/2001 |
| JP | 2011226780 A | 11/2011 |
| JP | 2016516169 A | 6/2016 |
| WO | 2012127959 A1 | 9/2012 |
| WO | 2016036380 A1 | 3/2016 |

* cited by examiner

GAS TURBINE ENGINE WITH RESONATOR RINGS

BACKGROUND

1. Field

Disclosed embodiments are generally related to gas turbine engines and, more particularly to resonators used in gas turbine engines.

2. Description of the Related Art

A gas turbine engine typically has a compressor section, a combustion section having a number of combustors and a turbine section. Ambient air is compressed in the compressor section and conveyed to the combustors in the combustion section. The combustors combine the compressed air with a fuel and ignite the mixture creating combustion products. The combustion products flow in a turbulent manner and at a high velocity. The combustion products are routed to the turbine section via transition ducts. Within the turbine section are rows of vane assemblies. Rotating blade assemblies are coupled to a turbine rotor. As the combustion product expands through the turbine section, the combustion product causes the blade assemblies and turbine rotor to rotate. The turbine rotor may be linked to an electric generator and used to generate electricity.

During the operation of gas turbine engines strong forces are generated that can impact the structure of the gas turbine engine. Accommodating these forces to continue to provide optimal operation is important for the continued operation of the gas turbine engine.

SUMMARY

Briefly described, aspects of the present disclosure relate to resonators.

An aspect of the disclosure may be a gas turbine engine having a combustor located within a combustor basket. The gas turbine engine may also have a resonator ring connected to the combustor basket; wherein the resonator ring comprises a first ring and a second ring, wherein the first ring is located upstream of the second ring; wherein the first ring comprises a first perimeter wall and a second perimeter wall extending in a circumferential direction, wherein located between the first perimeter wall and the second perimeter wall is a first bottom portion and a first top portion, wherein the first bottom portion has a first plurality of holes, wherein the first top portion has a second plurality of holes. Located between the first perimeter wall and the second perimeter wall is a first plurality of baffles, wherein each of the first plurality of baffles extends orthogonally with respect to the first perimeter wall and the second perimeter wall. The second ring comprises the second perimeter wall and a third perimeter wall extending in a circumferential direction, wherein located between the second perimeter wall and the third perimeter wall is a second bottom portion and a second top portion, wherein the second bottom portion has a third plurality of holes, wherein the second top portion has a fourth plurality of holes; and further wherein located between the second perimeter wall and the third perimeter wall is a second plurality of baffles, wherein each of the second plurality of baffles extends orthogonally with respect to the second perimeter wall and the third perimeter wall.

Another aspect of the disclosure may be a resonator ring connectable to a combustor basket comprising a first ring and a second ring, wherein the first ring is located upstream of the second ring. The first ring comprises a first perimeter wall and a second perimeter wall extending in a circumferential direction, wherein located between the first perimeter wall and the second perimeter wall is a first bottom portion and a first top portion, wherein the first bottom portion has a first plurality of holes, wherein the first top portion has a second plurality of holes. Located between the first perimeter wall and the second perimeter wall is a first plurality of baffles, wherein each of the first plurality of baffles extends orthogonally with respect to the first perimeter wall and the second perimeter wall. The second ring comprises the second perimeter wall and a third perimeter wall extending in a circumferential direction, wherein located between the second perimeter wall and the third perimeter wall is a second bottom portion and a second top portion, wherein the second bottom portion has a third plurality of holes, wherein the second top portion has a fourth plurality of holes; and further wherein located between the second perimeter wall and the third perimeter wall is a second plurality of baffles, wherein each of the second plurality of baffles extends orthogonally with respect to the second perimeter wall and the third perimeter wall.

DETAILED DESCRIPTION

The present inventors have recognized certain drawbacks that affect at least some existing resonators used in gas turbine engines. These drawbacks tend to add complexity and costs while lessening the operational reliability of the gas turbine engine. For example, these existing resonators tend to involve a relatively high cost of manufacturing and a relatively low use life. For example, a gas turbine engine may involve multiple such resonators or resonator boxes to achieve a desired acoustic damping. These resonator boxes may require extensive machining, multiple points of welding and difficult welding locations in order to install and achieve appropriate structural integrity. Furthermore, complex shapes may be required in order to provide cooling in the spaces between the resonator boxes thus complicating the design of the gas turbine engine.

In view of such recognition, the present inventors propose an innovative resonator ring structure that is expected to avoid or least reduce the foregoing drawbacks. Without limitation, disclosed embodiments of the resonator ring may be formed with more than one ring and may employ baffles in order to form improved resonator boxes. In the resonator ring disclosed herein the resonator boxes share walls, formed by the baffles. The sharing of walls removes the need for using complex features for cooling, thereby reducing the complexity of the design. Furthermore, difficult machining and welding of the resonator boxes are reduced thereby decreasing the overall cost of manufacture. Additionally, the use of the resonator ring permits improved cooling of the resonator ring and resonator boxes, thereby improving the life span of the components and reducing replacement of parts.

It should be understood that additional benefits may be achieved by the features disclosed here and not limited to those discussed above.

To facilitate an understanding of embodiments, principles, and features of the present disclosure, they are explained hereinafter with reference to implementation in illustrative embodiments. Embodiments of the present disclosure, however, are not limited to use in the described systems or methods.

The components and materials described hereinafter as making up the various embodiments are intended to be illustrative and not restrictive. Many suitable components and materials that would perform the same or a similar function as the materials described herein are intended to be embraced within the scope of embodiments of the present disclosure.

Figure 1:
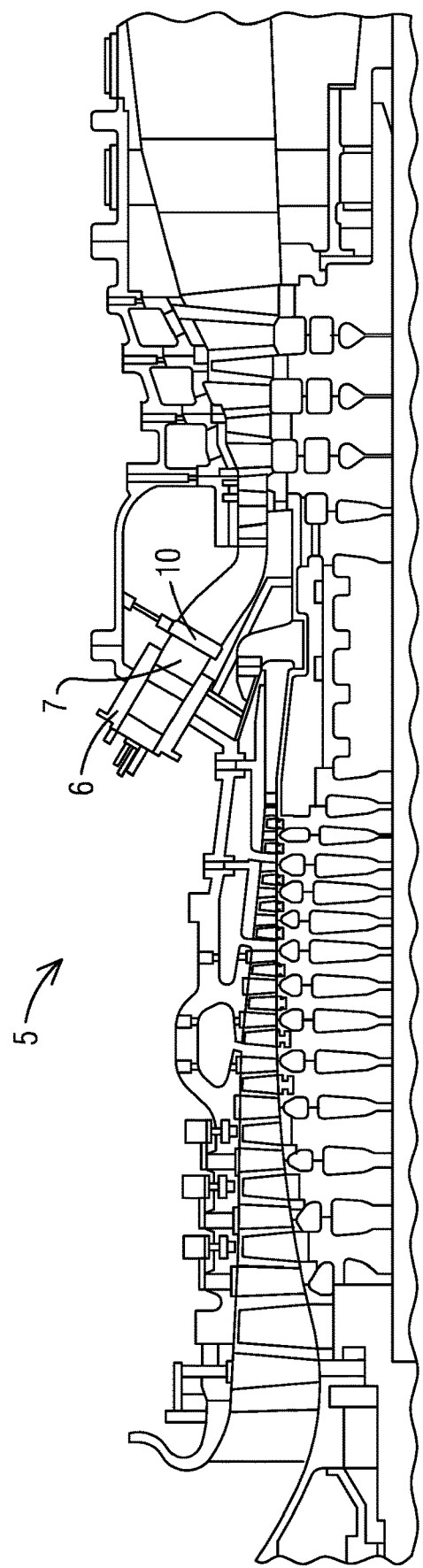
FIG. 1 shows a view of a gas turbine engine having a resonator ring.
Figure 2:
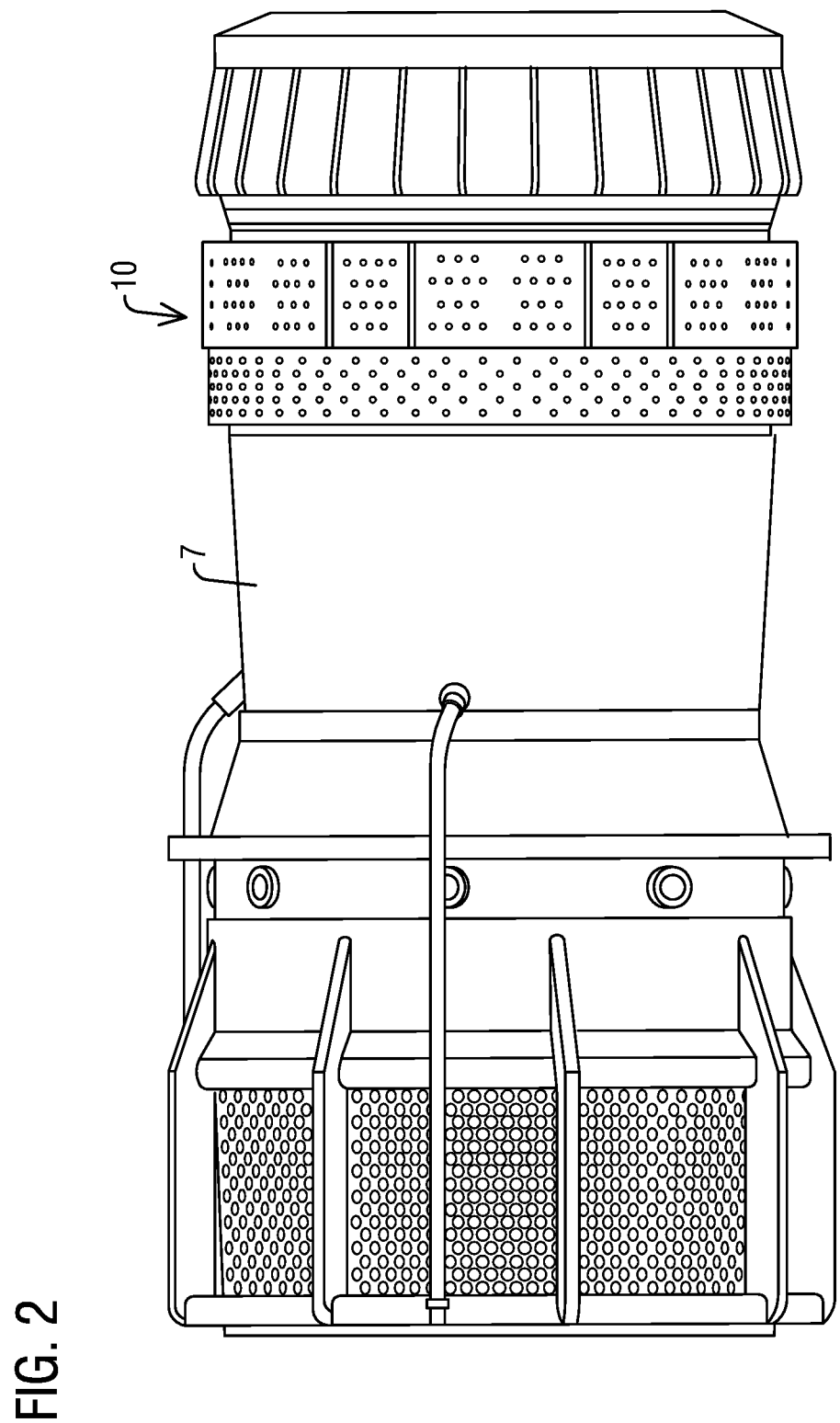
FIG. 2 shows a view of a combustor basket with the resonator ring.

FIG. 1 shows a view of the gas turbine engine 5. The combustor 6 is located within the combustor basket 7. FIG. 2 shows a close up view of the combustor basket 7 and the resonator ring 10. The combustor 6 produces combustion products that are transmitted downstream through the combustor basket 7 and the resonator ring 10 into the transition system. From there combustion products flow downstream to the turbine section and may be used to generate electricity.

The resonator ring 10 is able to control for various acoustical frequencies generated by the combustor 6 during operation of the gas turbine engine 5. Furthermore, the resonator ring 10 described herein is able to facilitate the ease with which it can be created and further improve the cooling that occurs in the resonator ring 10.

Figure 3:
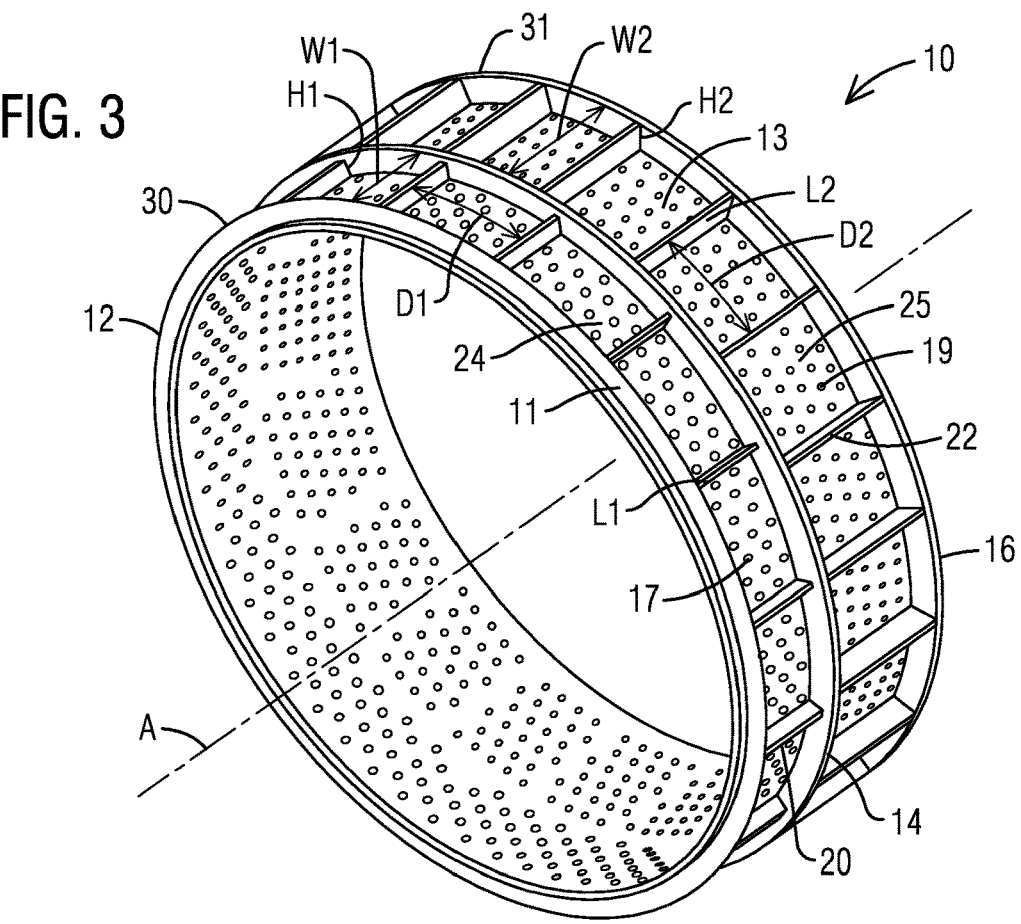
FIG. 3 is a view of the resonator ring without the top portions.

FIG. 3 is a view of the resonator ring 10 that permits viewing of the interior of the resonator ring 10. The resonator ring 10 has first ring 30 and a second ring 31. The second ring 31 is located downstream from the combustor 6. While the current embodiment shows a first ring 30 and a second ring 31 it should be understood that more or fewer rings may be employed. The number of rings employed may occur in accordance with the ideas set forth herein, depending on the size, shape and complexity needed for a particular gas turbine engine.

The first ring 30 is formed by a first perimeter wall 12 and a second perimeter wall 14 that extends circumferentially around the axis of the combustor 6 and combustor basket 7. The second ring 31 is formed by the second perimeter wall 14 and a third perimeter wall 16 that extends circumferentially around the axis of the combustor 6 and combustor basket 7. The first ring 30 and the second ring 31 may be formed together on a single unitary piece in order to form the resonator ring 10. However, it should be understood that they may be formed by separate pieces welded, brazed or joined in other ways understood by the skilled artisan.

The first ring 30 has a first bottom portion 11 that is bordered by the first perimeter wall 12 and second perimeter wall 14. The first bottom portion 11 extends circumferentially around the axis. The second ring 31 has a second bottom portion 13 that is bordered by the second perimeter wall 14 and the third perimeter wall 16. The second bottom portion 13 also extends circumferentially around the axis.

Figure 4:
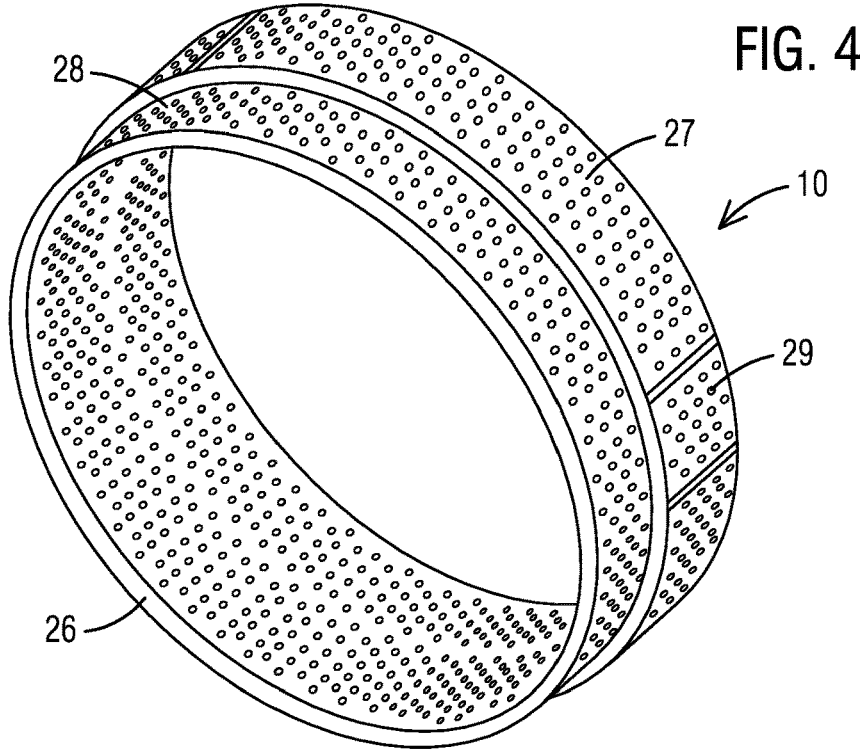
FIG. 4 is a view of the resonator ring with the top portion.

Referring to FIG. 4, during assembly a first top portion 26 will be placed over the space formed by the first bottom portion 11, the first perimeter wall 12 and the second perimeter wall 14. Additionally a second top portion 27 will be placed over the space formed by the second bottom portion 13, the second perimeter wall 14 and the third perimeter wall 16. The first top portion 26 and the second top portion 27 may be formed from single pieces or be formed from separate component pieces.

Referring back to FIG. 3, a plurality of first baffles 20 are located within the first ring 30. A plurality of second baffles 22 are located within the second ring 32. First baffles 20 extend orthogonally between the first perimeter wall 12 and the second perimeter wall 14. Second baffles 22 extend orthogonally between the second perimeter wall 14 and the third perimeter wall 16. While first baffles 20 and second baffles 22 are shown extending orthogonally, it should be understood that first baffles 20 and second baffles 22 may also extend at other angles and directions between the first perimeter wall 12, second perimeter wall 14 and third perimeter wall 16. With the installation of the first baffles 20 and second baffles 22 and the instalment of the first top portion 26 and the second top portion 27, first resonator boxes 24 and second resonator boxes 25 are formed in the first ring 30 and the second ring 31.

In the embodiment shown in FIG. 3, the first ring 30 has a number of first resonator boxes 24 that is different than the number of second resonator boxes 25 formed the second ring 31. Furthermore the overall size and volume of the first resonator boxes 24 are different than the second resonator boxes 25. This permits the first resonator boxes 24 in the first ring 30 to handle different acoustical frequencies than the second resonator boxes 25 in the second ring 31.

In the resonator ring 10 shown, the first baffles 20 have a length L1 that is less than a length L2 of the second baffles 22. This results in the width W1 of a first resonator box 24 being less than the width W2 of a second resonator box 25. As shown, the height H1 of the first baffle 20, is the same as the height H2 of the second baffle 22. However, it should be understood that the heights of the first baffles 20 and the second baffles 22 may be different thereby potentially forming different volumes.

The distance D1 between two adjacent first baffles 20 is greater than a distance D2 between two adjacent second baffles 22. Thus the resonator box 24 appears thinner than the resonator box 25, which appears squatter in FIG. 3. Furthermore, the area formed between adjacent first baffles 20 is less than an area formed between adjacent second baffles 22. Additionally, a volume formed between adjacent first baffles 20 is less than a volume formed between adjacent second baffles 22.

It should be understood that while, the dimensions of the resonator boxes 24 formed as part of the first ring 30 are different than the dimensions of the resonator boxes 25 formed as part of the second ring 31 that various components that form the dimensions may be altered to achieve different results, including having the same overall dimensions, or having some of the dimensions being the same, such as having the distance between two adjacent first baffles 20 be the same as a distance between two adjacent second baffles 22, but then having the lengths of the first baffles 20 be different than the lengths of the second baffles 22. Dimensional changes results in the acoustical frequencies compensated for by the first ring 30 and the second ring 31 being different.

Now referring to both FIGS. 3 and 4, a plurality of holes 17 are formed in the first bottom portion 11 and a plurality of holes 28 are formed in the first top portion 26. The distribution of the plurality of holes 17 and the plurality of holes 28 formed between the space defined by two adjacent first baffles 20 may vary. That is to say the number, spacing or size of the plurality of holes 17 may be different than the number, spacing or size of the plurality of holes 28. However, it should be understood that they may be the same.

The plurality of holes 19 formed in the second bottom portion 13 and the plurality of holes 29 formed in the second top portion 27 can have a different distribution than the plurality of holes 17 and the plurality of holes 28. Also, the distribution of the plurality of holes 19 and the plurality of holes 29 formed between the space defined by two adjacent first baffles 22 may vary. That is to say the number, spacing or size of the plurality of holes 19 may be different than the number, spacing or size of the plurality of holes 29. However, it should be understood that they may be the same.

Figure 5:
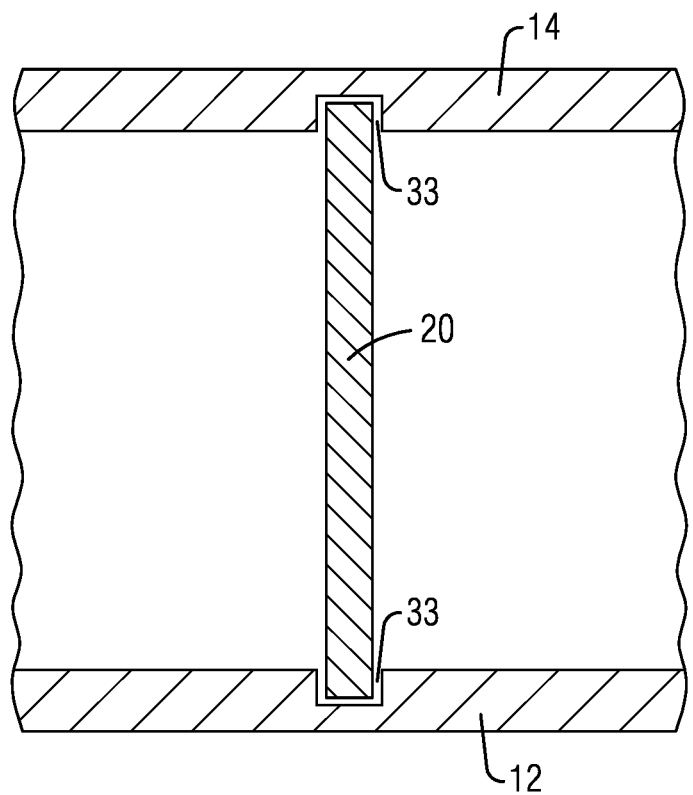
FIG. 5 is a schematic diagram of the interior of the resonator ring showing an installation of a baffle.
Figure 6:
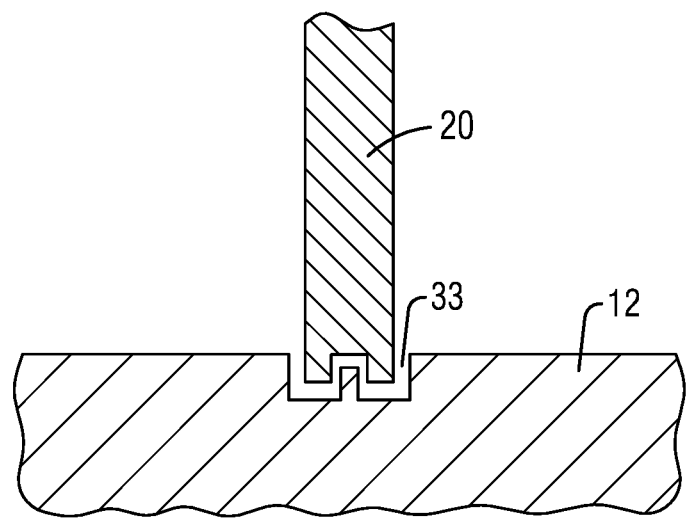
FIG. 6 is a schematic diagram of the interior of the resonator ring showing a labyrinth lock.

FIG. 5 is a schematic diagram of the interior of the resonator ring 10 showing an installation of a baffle 20. The installation of the baffle 20 shown in FIG. 4 is also applicable to the installation of the baffle 22. Here it is shown how the baffle 20 is inserted into a slot 33 located in the first perimeter wall 12 and the second perimeter wall 14. Likewise, a similar slot 33 is found within the third perimeter wall 16. The slot 33 permits installation of the baffles and welding to the respective walls without requiring the bottom of the baffle 20 to welded to the first bottom portion 11. However it should be understood that baffle 20 can also be welded to the first bottom portion 11. This permits for better disruption of circumferentially propagating acoustical waves in the first ring 30. A similar set-up in the second ring 31 also accomplishes the same thing. In alternative embodiments, instead of being inserted into the slots 33, the baffles 20 may be held in place through the use of labyrinth locks 44, as shown in FIG. 6. Labyrinth locks 44 may also be located on first bottom portion 11 and second bottom portion 13.

The usage of baffles 20 and baffles 22 allow for easier placement of resonators on the gas turbine engine 5. The baffles 20 and the baffles 22 also reduce the amount of welding that may be required when using other types of resonators. Additionally the baffles 20 and the baffles 22 also reduce the amount of material needed to construct the resonators. The first ring 30 and the second ring 31 can also be adjusted to accommodate different frequencies.

While embodiments of the present disclosure have been disclosed in exemplary forms, it will be apparent to those skilled in the art that many modifications, additions, and deletions can be made therein without departing from the spirit and scope of the invention and its equivalents, as set forth in the following claims.

What is claimed is:

1. A gas turbine engine comprising:
a combustor located within a combustor basket;
a resonator ring connected to the combustor basket; wherein the resonator ring comprises a first ring and a second ring, wherein the first ring is located upstream of the second ring;
wherein the first ring comprises a first perimeter wall and a second perimeter wall extending in a circumferential direction, wherein located between the first perimeter wall and the second perimeter wall is a first bottom portion and a first top portion, wherein the first bottom portion has a first plurality of holes, wherein the first top portion has a second plurality of holes;
further wherein located between the first perimeter wall and the second perimeter wall is a first plurality of baffles, wherein each of the first plurality of baffles extends orthogonally with respect to the first perimeter wall and the second perimeter wall;
wherein the second ring comprises the second perimeter wall and a third perimeter wall extending in a circumferential direction, wherein located between the second perimeter wall and the third perimeter wall is a second bottom portion and a second top portion, wherein the second bottom portion has a third plurality of holes, wherein the second top portion has a fourth plurality of holes;
further wherein located between the second perimeter wall and the third perimeter wall is a second plurality of baffles, wherein each of the second plurality of baffles extends orthogonally with respect to the second perimeter wall and the third perimeter wall,
wherein a distribution of the second plurality of holes formed in first top portion is different than a distribution of the fourth plurality of holes formed in the second top portion, and
wherein the distribution comprises spacing or size of the second plurality of holes and the fourth plurality of holes,
wherein the first perimeter wall comprises a first plurality of slots and the second perimeter wall comprises a second plurality of slots, and
wherein each of the first plurality of baffles is inserted to a respective slot of the first plurality of slots and a respective slot of the second plurality of slots.

2. The gas turbine engine of claim 1, wherein a length of each baffle of the first plurality of baffles is different than a length of each of the second plurality of baffles.

3. The gas turbine engine of claim 1, wherein a distance between adjacent baffles of the first plurality of baffles is greater than a distance between adjacent baffles of the second plurality of baffles.

4. The gas turbine engine of claim 1, wherein a total number of baffles in the first plurality of baffles is different than a total number of baffles in the second plurality of baffles.

5. The gas turbine engine of claim 1, wherein a distribution of the first plurality of holes formed in the first bottom portion is different than a distribution of the third plurality of holes formed in the second bottom portion, and wherein the distribution comprises spacing or size of the first plurality of holes and the third plurality of holes.

6. The gas turbine engine of claim 1, wherein the first top portion is formed from a plurality of top portion sections.

7. The gas turbine engine of claim 1, wherein an area of the first bottom portion between adjacent baffles of the first plurality of baffles is greater than an area of the second bottom portion between adjacent baffles of the second plurality of baffles.

8. The gas turbine engine of claim 1, wherein a volume formed between adjacent baffles of the first plurality of baffles is greater than a volume formed between adjacent baffles of the second plurality of baffles.

9. The gas turbine engine of claim 1, wherein a diameter of each hole in the first plurality of holes is smaller than a diameter of each hole in the second plurality of holes.

10. The gas turbine engine of claim 1, wherein each of the first plurality of baffles is secured with a labyrinth seal.

11. A resonator ring connected to a combustor basket comprising:
a first ring and a second ring, wherein the first ring is located upstream of the second ring;
wherein the first ring comprises a first perimeter wall and a second perimeter wall extending in a circumferential direction, wherein located between the first perimeter wall and the second perimeter wall is a first bottom portion and a first top portion, wherein the first bottom portion has a first plurality of holes, wherein the first top portion has a second plurality of holes;

further wherein located between the first perimeter wall and the second perimeter wall is a first plurality of baffles, wherein each of the first plurality of baffles extends orthogonally with respect to the first perimeter wall and the second perimeter wall;

wherein the second ring comprises the second perimeter wall and a third perimeter wall extending in a circumferential direction, wherein located between the second perimeter wall and the third perimeter wall is a second bottom portion and a second top portion, wherein the second bottom portion has a third plurality of holes, wherein the second top portion has a fourth plurality of holes;

further wherein located between the second perimeter wall and the third perimeter wall is a second plurality of baffles, wherein each of the second plurality of baffles extends orthogonally with respect to the second perimeter wall and the third perimeter wall, wherein a distribution of the second plurality of holes formed in the first top portion is different than a distribution of the fourth plurality of holes formed in the second top portion, and wherein the distribution comprises spacing or size of the second plurality of holes and the fourth plurality of holes, wherein the first perimeter wall comprises a first plurality of slots and the second perimeter wall comprises a second plurality of slots, and wherein each of the first plurality of baffles is inserted to a respective slot of the first plurality of slots and a respective slot of the second plurality of slots.

12. The resonator ring of claim 11, wherein a length of one of the first plurality of baffles is different than a length of one of the second plurality of baffles.

13. The resonator ring of claim 11, wherein a distance between adjacent baffles of the first plurality of baffles is greater than a distance between adjacent baffles of the second plurality of baffles.

14. The resonator ring of claim 11, wherein a total number of baffles in the first plurality of baffles is different than a total number of baffles in the second plurality of baffles.

15. The resonator ring of claim 11, wherein a distribution of the first plurality of holes formed in the first bottom portion is different than a distribution of the third plurality of holes formed in the second bottom portion, and wherein the distribution comprises spacing or size of the first plurality of holes and the third plurality of holes.

16. The resonator ring of claim 11, wherein the first top portion is formed from a plurality of top portion sections.

17. The resonator ring of claim 11, wherein an area formed between adjacent baffles of the first plurality of baffles is less than an area formed between adjacent baffles of the second plurality of baffles.

18. The resonator ring of claim 11, wherein a volume formed between adjacent baffles of the first plurality of baffles is less than a volume formed between adjacent baffles of the second plurality of baffles.

19. The resonator ring of claim 11, wherein a diameter of each hole in the first plurality of holes is smaller than a diameter of each hole in the second plurality of holes.

20. The resonator ring of claim 11, wherein each of the first plurality of baffles is secured with a labyrinth seal.

* * * * *